(12) United States Patent
Boelkins

(10) Patent No.: US 6,213,412 B1
(45) Date of Patent: Apr. 10, 2001

(54) SPRAY HEAD ASSEMBLY FOR LUBRICANTS, COOLANTS AND THE LIKE

(75) Inventor: Wallace G. Boelkins, Grand Rapids, MI (US)

(73) Assignee: Uni-Mist, Inc., Grand Rapids, MI (US)

( * ) Notice: Subject to any disclaimer, the term of this patent is extended or adjusted under 35 U.S.C. 154(b) by 0 days.

(21) Appl. No.: 09/146,174

(22) Filed: Sep. 3, 1998

Related U.S. Application Data

(60) Provisional application No. 60/058,138, filed on Sep. 8, 1997.

(51) Int. Cl.[7] .................................................. B05B 1/30
(52) U.S. Cl. .................. 239/533.1; 239/562; 239/443; 239/446; 239/556; 239/570; 239/60; 239/544; 239/567
(58) Field of Search ........................... 239/533.1, 551, 239/562, 443, 446, 447, 556, 570, 600, 587.1, 544, 567, 533.13

(56) References Cited

U.S. PATENT DOCUMENTS

| | | | |
|---|---|---|---|
| 2,323,464 | * 7/1943 | Glessner | 239/443 |
| 2,364,717 | * 12/1944 | Huss | 239/562 |
| 2,373,555 | * 4/1945 | Folke | 239/602 |
| 2,392,085 | * 1/1946 | Ferrel | 239/533.13 |
| 2,499,092 | * 2/1950 | Burnam | 239/544 |
| 3,059,860 | 10/1962 | Hohn | 239/423 |
| 3,214,102 | * 10/1965 | Meyer | 239/602 |
| 3,219,276 | * 11/1965 | Norris | 239/562 |
| 3,227,378 | 1/1966 | Stewart | 239/412 |
| 3,266,735 | 8/1966 | Webb | 239/284 |
| 3,478,843 | 11/1969 | Eckardt | 184/6 |
| 3,618,709 | 11/1971 | Boelkins | 184/6.4 |
| 3,868,195 | 2/1975 | Anderson et al. | 408/61 |
| 3,888,420 | 6/1975 | Boelkins | 239/412 |
| 4,013,227 | * 3/1977 | Herrera | 239/544 |
| 4,391,620 | 7/1983 | Geisel | 65/26 |
| 4,709,717 | * 12/1987 | Rannigan et al. | 239/567 |
| 4,754,848 | 7/1988 | Azzopardi et al. | 184/6.26 |
| 4,834,218 | * 5/1989 | Dombroski et al. | 239/412 |
| 5,074,471 | * 12/1991 | Baumgarten et al. | 239/602 |
| 5,205,378 | 4/1993 | Boelkins | 184/55.1 |
| 5,454,515 | * 10/1995 | Perret | 239/600 |
| 5,624,075 | * 4/1997 | Dankert | 239/600 |
| 5,655,608 | * 8/1997 | Sundholm | 239/446 |
| 5,855,321 | * 1/1999 | Hayes | 239/11 |

* cited by examiner

Primary Examiner—Patrick Brinson
Assistant Examiner—Dinh Q. Nguyen
(74) Attorney, Agent, or Firm—Price, Heneveld, Cooper, DeWitt & Litton

(57) ABSTRACT

A spray head assembly particularly, but not exclusively, adapted for use in conjunction with a pulse-action lubrication system that dispenses measured quantities of fluid and propels the fluid through a fluid-carrying apparatus to the spray head assembly. The spray head assembly applies the fluid, e.g., lubricant or coolant, to a target object or article, in particular, a cutting tool, at the remote end of said tube, in the form of a dispersion. The spray head assembly has a plurality of outlet apertures which are disposed at predetermined locations and at predetermined angles with respect to the target object, so as to apply the fluid to multiple surfaces of the target object and thereby ensure thorough lubrication, cooling, etc. of the surfaces of the target object. Furthermore, the spray head assembly contains a mounting member, adapted to be secured along the length of the body of the spray head assembly, that is used to mount the spray head assembly for continuous same-position application of fluid to the surfaces of the target object.

35 Claims, 1 Drawing Sheet

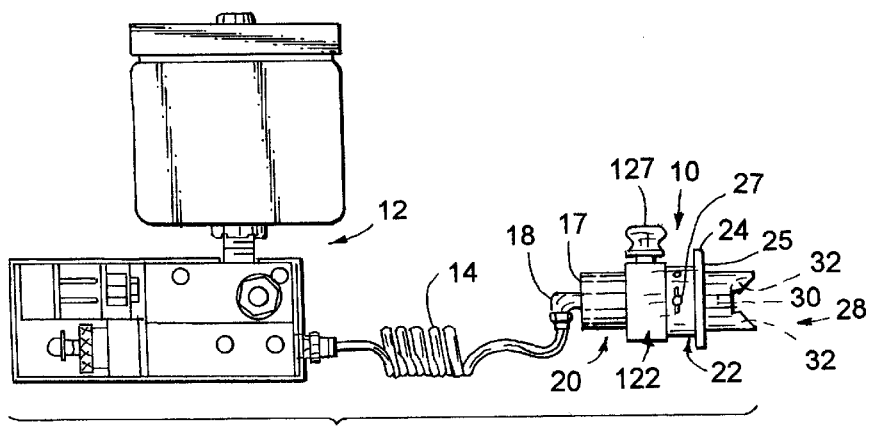
Fig. 1
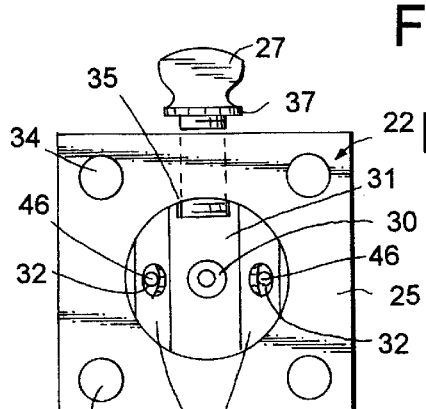
Fig. 4
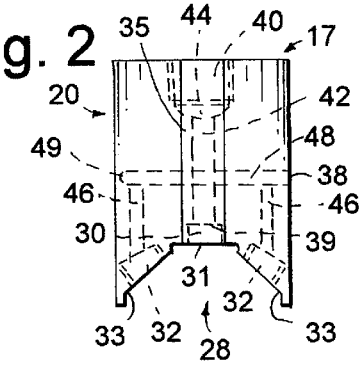
Fig. 6
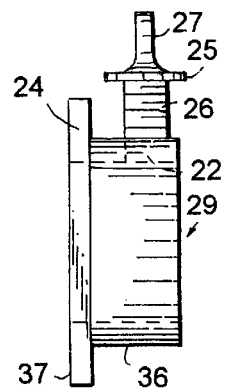
Fig. 5
Fig. 3
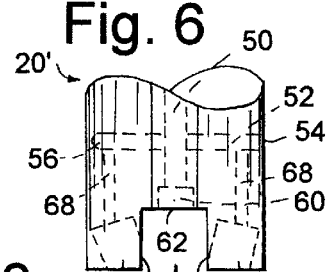
Fig. 7
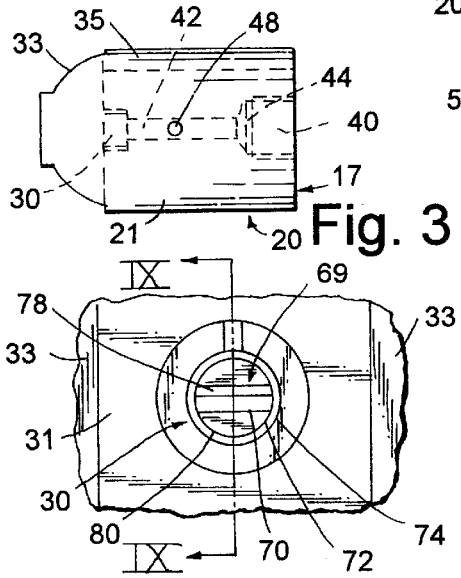
Fig. 8
Fig. 9

SPRAY HEAD ASSEMBLY FOR LUBRICANTS, COOLANTS AND THE LIKE

CROSS-REFERENCE TO RELATED APPLICATION

This application claims priority under 35 U.S.C. §119(e) on U.S. Provisional Application No. 60/058,138 entitled SPRAY HEAD ASSEMBLY FOR LUBRICANTS, COOLANTS AND THE LIKE filed Sep. 8, 1997, by Wallace G. Boelkins, the entire disclosure of which is incorporated herein by reference.

FIELD OF THE INVENTION AND BACKGROUND

The present invention relates to devices for emitting and applying fluid to a target object at a remote location and more particularly to devices adapted to dispense and accurately apply fluid, e.g., lubricant, coolant, etc., in a spray form to a selected target. Even more particularly, the invention relates to devices containing multiple output orifices which are particularly positioned to direct the fluid dispensed therefrom at selected surfaces of the target object.

In industrial operations, particularly in cutting and machining operations, it has long been recognized that it is highly desirable to apply liquid lubricants or coolants to the cutting tools or workpieces, and often to power tools and other machinery as well, throughout their duty cycles. Preferably, the lubricant or coolant is applied to the desired object or article in a pulsatory fashion and is regulated so that the pulses of fluid are supplied on an essentially continuous basis during each cycle of the industrial operation. Although sometimes such coolants and lubricants are applied as a stream, often it is desired to have the coolant or lubricant applied in a mist or "atomized" form by, for example, spraying it from an appropriate nozzle. When applied in mist form, a comparable amount of fluid can cover a larger surface area of the target object than when it is applied as a stream, thus adding efficiency and economy to the lubricating/cooling process.

As such, the instant invention is typically used in conjunction with a fluid supply apparatus for automatically and repeatedly measuring out and discharging predetermined discrete quantities of fluid, e.g., lubricant or coolant, from a reservoir containing a supply of the same, as shown in U.S. Pat. No. 5,524,729. In that system, measured amounts of fluid are emitted in a finely divided (i.e., spray or mist) form toward a target object, for example, a device used in an industrial operation. More particularly, the '729 patent discloses a fluid supply system that pneumatically produces a generally uniform application of lubricant or coolant, having a selectively variable density. As fluid exits the output port of the fluid supply, it is transported through a passage, such as a tube, to a remote area where it is applied to a target object through a dispensing device such as a spray head.

Known dispensing nozzles typically contain a single output orifice for application of the lubricant or coolant to the target object. However, such a device is often inadequate, as for example, when the target object has multiple surfaces that require lubrication (or cooling) during operation of the equipment. Therefore, it would be desirable to have a spray head that is adapted to apply the fluid to each and all of such multiple surfaces, and often at a variety of angles, to ensure thorough lubricating/cooling of the target areas while avoiding other areas and overspray. By covering all of the desired surface area with fluid, the target object will experience less wear and tear during operation of the machinery and the expenses associated with maintenance and/or replacement of the target object or other associated equipment will be reduced. At the same time, excess fluid usage is avoided, with resultant economic and environmental savings.

Accordingly, rather than merely one output orifice, the dispensing apparatus provided herewith may have a series of orifices that provide a broad area of fluid coverage when necessary. Preferably, the output apparatus is shaped so that the series of spray orifices provided therein direct the fluid over a particular surface area on the target object, which may have a particular shape or profile.

Further, often it is desirable to provide an accurately and reliably fixed position of emission of fluid to the surfaces of the target object. In other such applications, the spray head assembly must be adapted to be mounted for adjustable movement from one stationary position to another. Note that any additional structure required for mounting should be connected to the spray head assembly for ready adaptability and convenience of use. To minimize costs of production and maximize convenience of use, the spray head assembly, including its multiple output orifices and its mounting structure, should be contained in a single, integrated structure.

SUMMARY OF THE INVENTION

The spray head assembly of the instant invention is adapted to apply a metered quantity of fluid, particularly over a selected area profile to a plurality of selected surfaces on a target object, e.g., a cutting tool.

In a particular embodiment, the invention comprises a spray head assembly having an input end adapted to be connected to the output of a lubrication system, and an output end with a plurality of particularly located spray orifices that simultaneously dispense the fluid over multiple surfaces of the target object. In a specific embodiment, the input end of the assembly has a female receptacle adapted to receive and lock a male push-in fitting connected to the output end of a fluid carrying apparatus, such as a nylon tube. The output end may be generally concave or recessed, having an innermost surface that contains a center orifice through which fluid is dispensed and various side orifices which spray fluid toward the center. The center output orifice is connected to and axially aligned with a fluid-carrying channel that is connected to the female receptacle at the input end. The sidewalls of the concave output end contain a series of side output orifices, connected to a network of fluid-carrying channels and positioned to direct the fluid generally toward side surfaces of the target object.

In the preferred embodiment, the fluid is dispensed through a valve that is mounted within each output orifice. The valve is made of an elastomeric material and contains a series of "stepped" sections that have progressively narrower diameters from the input end to the output end of the valve. In addition, the input end of the valve contains an annular flange that, when mounted, contacts the inner wall of the orifice to provide a fluid-tight seal between the valve and the orifice. To hold the valve within the orifice and to ensure the integrity of the fluid-tight seal, a retaining insert is placed against the outward-facing surface of the annular flange of the valve to engage the interior walls of the orifice.

Furthermore, in the preferred embodiment, the spray head assembly contains a mounting plate for securing the spray head in stationary position. The mounting plate is comprised of a collar section and a flange section that are integral with each other. The mounting plate has a center opening sized to be mated with the outside of the spray head. So that the mounting plate may be locked at a desired position, the collar of the mounting plate contains a securing means, such as a setscrew. With the mounting plate tightened to the spray head, the flange of the mounting plate can be secured to a stationary structure to maintain the position of the spray head assembly relative to the target object. Alternatively, the mounting plate can be removed and the spray head assembly can be mounted in a number of other ways.

In another embodiment, the output end of the spray head assembly has a rectangularly stepped shape. In such a configuration, the orifices of the output end are positioned to dispense the fluid in a more outwardly directed pattern. Typically, such a configuration will be utilized when the target object is narrower and longer, e.g., a circular saw blade, to maximize the side area covered by the fluid. Of course, the output end of the spray head assembly could be tooled to many different particular shapes, depending upon the user's requirements.

These and other features, advantages and objects of the present invention will be further understood and appreciated by those skilled in the art by reference to the following specification, claims, and appended drawings.

BRIEF DESCRIPTION OF THE DRAWINGS

FIG. 1 is a profile view illustrating the fluid application system showing the source of fluid, the fluid carrying apparatus, and one embodiment of the spray head assembly;

FIG. 2 is a top view of the exemplary spray head of FIG. 1, the dashed lines showing the internal structure at the input and output ends thereof;

FIG. 3 is a side elevational view of the spray head assembly of FIGS. 1 and 2;

FIG. 4 is an end view of the spray head assembly of FIGS. 1, 2, and 3 showing the mounting plate and output end thereof;

FIG. 5 is a profile view of the mounting plate and its associated collar;

FIG. 6 is a fragmentary top view of an alternate embodiment of the spray head assembly;

FIG. 7 is an end view of the alternate embodiment of the spray head assembly shown in FIG. 6;

FIG. 8 is an enlarged, fragmentary end view of one orifice of the output end of the spray head assembly; and FIG. 9 is an enlarged, fragmentary cross-sectional side view of one orifice of the spray head assembly, showing the preferred valve.

DETAILED DESCRIPTION OF PREFERRED EMBODIMENT

Referring in more detail to the drawings, the spray head assembly 10 is shown generally in FIG. 1, in conjunction with a fluid supply apparatus 12 that provides a pulse-action mist output. The spray head assembly 10 has a mounting structure 22 comprising a collar 26 (FIGS. 4 and 5) and associated mounting flange 24 connected thereto, which may be adjustably secured to the spray head assembly. The mounting flange 24 is secured to a selected stationary support (not shown), whereby the mounting structure 22 holds the spray head assembly 10 in a selected stationary position for consistently supplying the target object with particularly located and directed metered pulses of fluid. An optional positioning collar 122 (FIG. 1) may be adjustably secured to the body 20 of spray head 10 at a selected position to provide a convenient and effective means for rapidly and accurately indexing the longitudinal position of spray head 10 relative to mounting structure 22, and thus to the target object, by sliding body 20 through collar 26 until the leading edge of collar 122 comes into abutting contact with the adjacent edge of collar 26.

A fluid carrying apparatus 14 is connected to the output of the fluid supply apparatus 12 and transports the fluid dispensed from the fluid supply to the spray head assembly 10 at a remote location. Typically, the fluid carrying apparatus 14 is a length of tubing made of nylon or the like, often having an outer diameter of approximately ⅛ inch. The output end of the fluid-carrying apparatus 14 preferably contains a male plug-in fitting 18 that is adapted to mate with the input end 17 of the spray head assembly 10. The engagement between the male plug-in fitting 18 and the input of the spray head assembly 10 provides a leak-proof connection between the two. As the fluid supply apparatus 12 pumps fluid through the system, fluid enters the input end of the spray head assembly 10 and passes through the body 20 thereof, where it is divided and transported to the output end 28 through various internal passages (FIGS. 2 and 6). At its output end, the spray head assembly preferably has spray valves 69 (as shown in FIGS. 8 and 9, and described below) mounted within each of its multiple output orifices 30, 32 to emit the pulses of fluid.

Referring next to FIG. 2, the input end 17 and the output end 28 of the spray head assembly 10 are shown in more detail. The input end 17 has a recess 40 adapted to receive the male plug-in fitting 18, thus providing a leak-proof connection between the fluid-carrying apparatus 14 (shown in FIG. 1) and the spray head assembly 10. When the push-in fitting is brought into engagement with the input end 17 of the body 20, the fitting 18 locks within the recess 40 by way of a locking structure 44, shown with dashed lines in FIG. 2.

FIG. 2 also shows the network of flow channels which are provided (in this example by boring) through the body 20 to divide and transport the fluid from the input end 17 to the output end 28 of the spray head assembly 10. Staring at the input end, a center channel 42 extends from the recess 40, along the center of the body and through the center orifice 30 at the output end 28 thereof. Near the output end 28, a cross-channel 48 extends through the exterior surface of the body 20 and across its width, so that it intersects the center channel 42 at a right angle. As best shown by the dashed lines in FIG. 2, the cross-channel 48 does not necessarily extend entirely across the width of the body, thus leaving one completely closed end 49 in the cross-channel 48. The opposite end 38 of the cross-channel 48 is open, but, when in use, is kept closed with a stop means, such as a plug (not shown). The cross-channel 48 is further connected to the center channel 42 and a series of side channels 46. The side channels 46 connect the cross-channel 48 to the side output orifices 32 and are positioned to extend through the center of the side output orifices 32. As fluid flows from the input end 17 of the spray head assembly 10, through the center channel 42 and into the cross-channel 48, it is divided between the center channel 42 and the series of side channels 46, all of which are preferably perpendicular to the cross-channel if made by boring.

More particularly, as best shown in FIGS. 2 and 3, the preferred embodiment of the body 20 has a concave or recessed output end 28 having a bottom or inner surface 31 with a center output orifice 30 formed therein. In addition, the recessed output end 28 has sidewalls 33 containing side output orifices 32 that are preferably positioned opposite each other. In this configuration, fluid passing through the system is divided by the network of flow channels 48, 46 inside body 20, and is dispensed through the output orifices 32 at equal angles on either side of the center axis of the body 20, to provide the broadest area of fluid application to the surfaces of the target object. Of course, other output orifice locations may be selected to provide different coverage profiles. FIGS. 2, 3 and 4, also show a slot 35 that extends along the top of body 20. Slot 35 is adapted to receive a connecting means (e.g., setscrew 27, FIGS. 4 and 5) of the mounting structure 22. By this arrangement, the mounting structure 22 can be slid along and secured at any desired position of adjustment along the length of the body 20.

Referring next to FIGS. 4 and 5, the flange 24 of mounting structure or assembly 22 is shown having a series of apertures 34 that are adapted to receive an attaching means (not shown) such as a screw, etc. for mounting the spray head assembly 10 to a physical support (not shown) in a desired location. The mounting structure 22 consists of a sleeve-like collar 26 sized to be closely but freely telescoped over the body 20, and a flange structure 24 attached to or integral with collar 26. The mounting structure 22, including the collar 26 and the flange 24, is preferably a one-piece structure. Note that an opening 29 inside collar 26 is shown in dashed lines in FIG. 5.

The mounting structure 22 may be secured to the body 20 of the spray head assembly 10 with a fastening means 27, e.g., a thumb screw, having an easy-gripping annular rim 37 and a threaded shaft 36, which extends through a threaded aperture in the collar 26. To secure the mounting structure 22 to the body 20, the mounting structure is first placed over the body 20 so that the threaded aperture, containing the setscrew 27, is aligned with the slot 35. After positioning the mounting structure 22 at a desired location along the length of the body 20, the user tightens the fastening means 27 so the bottom surface of threaded shaft 36 engages the bottom surface of the slot 35, thus securing the mounting structure 22 to the body 20 at a selected position along its length. The flange 24 is then (or was previously) secured to the external support by the aforementioned fasteners extending through apertures 34.

As noted above, a positioning collar 122 (FIG. 1) may be used to readily index spray head assembly 10 in place with respect to mounting structure 22, especially where the latter is already secured to the external support and it is desired to mount the spray head assembly 10 in a preselected position relative to mounting structure 22. In such a case the auxiliary collar 122 is secured in place along body 22 at the desired position, and the body then slid through collar 26 of mounting structure 22 until the auxiliary collar 122 comes into contact with collar 26, whereby accurate positioning is readily accomplished. As will be apparent from FIG. 1, auxiliary positioning member 122 has a structure essentially the same as collar 26, and its set screw 127 is essentially the same as, and used in the same way as, set screw 27 described above.

With the mounting structure or assembly 22 secured to the body 20 of spray head assembly 10, the spray head assembly 10 is or can be mounted to a stationary support or structure (not shown) in a particular selected position and location, so as to provide repeated application of fluid to a particular portion of or location on the target object. This is accomplished by securing the flange 24 of the mounting assembly 22 to the stationary structure using mechanical fasteners (not shown) extended through apertures 34.

Turning next to FIGS. 6 and 7, an alternate embodiment 20' of the body is shown having a stepped (rectangularly recessed) output end 58 for applications in which the target object is narrow and has broad side surfaces. For example, such a configuration could be used when applying lubricant to the sides of a saw blade. This embodiment, similar to the previous embodiment, contains a center channel 50 that extends along the axis of the body 20' for dispensing fluid through the center output orifice 60. The center output orifice 60 is formed in the inner wall 62 of output end 58 and has a valve mounted therein for dispensing fluid directly to the target object. The body 20' also contains a cross-channel 52 that extends approximately the width of the body, thus leaving a closed end 56 and an open end 54. When in operation, the open end 54 of this cross-channel 52 contains a stop means such as a plug, etc. (not shown) to close this end of the channel. Furthermore, a series of side channels 68, parallel to the center channel 50, connect the cross-channel 52 to the side output orifices 66. As fluid traverses through the body 20', the network of channels divides the fluid so that it may be dispensed through both the center orifice 60 and the series of side orifices 66, to provide fluid coverage to all desired surfaces of the target object.

FIG. 7 shows the output end 58 of the spray head assembly alternate embodiment 20', including the inner wall 62 and the sidewalls 64, along with the orifices 60, 66 formed therein, respectively. Side channels 68 connect cross-channel 52 to side output orifices 66 and are formed by boring (for example) through the center of side output orifices 66. In addition, each orifice contains a valve 69 (shown in FIGS. 8 and 9 and described below) held therein by a retaining insert 80. Similar to the previous embodiment, the body 20' contains a lengthwise slot 78 that is adapted to receive the shaft of a thumb screw of the mounting structure 22 for securing the mounting structure to the body. As before, the spray head assembly 10 can be secured to a stationary apparatus (not shown) by attaching the flange 24 of the mounting structure to a given support.

In sum, the output end 19 of the spray head assembly 10 may have a variety of shapes and a variety of different spray outlet patterns, and contain a network of internal fluid-carrying channels.

Turning next to FIGS. 8 and 9, a preferred type of valve 69 is shown mounted within one of the orifices 30, 32 at the output end 28 of the preferred embodiment of the spray head assembly 10. The valve 69 is made from an elastomeric material and has a series of stepped external sections 72, 74, 76 of varying diameter, together with a generally rectangular tip 70 extending across the diameter. The tip 70 of valve 69 contains a resilient slit-like opening 78 (FIG. 8), which is normally closed, that is designed to emit fluid when the pressure within the valve is sufficiently large, i.e., in excess of a threshold "cracking" pressure. At its input, the valve 69 has an annular elastomeric flange 76, integral with the body 74 of the valve, that is adapted to seat the valve within the respective orifice. The valve 69 is held within the orifices 30, 32 by a split ring or other such retaining insert 80 (described below).

In operation, fluid volume and pressure builds in the valve 69 as the supply 12 discharges each successive pulse, and when the pressure at the tip 70 reaches a threshold "cracking" pressure, the slit-like opening 78 in the tip 70 of valve 69 opens and releases a metered quantity of fluid, typically in mist form, toward the target object. Of course, where the supply 12 provides lengthy or continuous "pulses," the discharge is of corresponding duration.

As best shown in FIG. 9, to mount a valve 69 within an orifice 30, 32, the valve is placed in the orifice (e.g., the center orifice 30 shown in FIG. 8), so that the elastomeric flange 76 seats against the inner wall 39 of the orifice. With the valve 69 seated within the orifice, the free ends of a C-shaped retaining ring insert 80 are squeezed together, temporarily reducing the diameter of the insert. The insert is then placed over the output end of the valve and moved along the body 74 of the valve until it contacts the outward-facing edge 79 of the elastomeric flange 76. With the retaining insert 80 resting against the flange 76, the flee ends of the insert are released so that they flex outwardly against the sidewalls 41 of the orifice. As a result, the valve 69 is prevented from inadvertently disengaging from the orifice 30, 32 in response to the pressure of the fluid flowing through the system.

In operation, the fluid supply 12 emits a metered or other quantity of fluid into a fluid-carrying apparatus 14 that transports the fluid from the fluid supply to the spray head assembly 10. As the fluid, now preferably in a mist or spray-like form, passes through the output of the fluid carrying apparatus 14, through the male push-in fitting 18, and into the input end 17 of the spray head assembly 10, the fluid enters the center channel 42 of the body 20 and propagates through the body 20 until it reaches the cross-channel 48. The cross-channel 48 divides the metered quantity of fluid between the center channel 42 and the parallel side channels 46, where it is further transported to the output orifices 30, 32, respectively, of the system. As the fluid passes into the output orifices 30, 32, it flows into the input end 75 of the valve 69 retained therein. As described above, when the pressure at the tip 70 of the valve exceeds a predetermined threshold amount, the slit-like opening in the tip 70 expands to emit a pulse of fluid, usually in a mist or spray-like form. As a result, fluid is emitted through each of the output orifices 30, 32 to provide the desired pattern of fluid coverage to the target object.

When the fluid pressure inside body 20 and valve 69 decreases, the slit-like tip opening closes, and the output fluid spray ends until the supply 12 again pumps fluid through the system. The user can adjust the fluid supply 12 so that it is synchronized with the operation of the target object. This process repeats, to continuously synchronously lubricate and/or cool the target object during the cyclic operation of the controlling equipment.

The above description is considered that of the preferred embodiments only. Modifications of these embodiments and other embodiments of the underlying invention will occur to those skilled in the art and to those who make or use the invention. Therefore, it is to be understood that the embodiments shown in the drawings and described above are merely for illustrative purposes and should not be used to limit the scope of the invention, which is defined by the following claims as interpreted according to the principles of patent law, including the doctrine of equivalents.

The invention claimed is:

1. A spray head assembly for use in conjunction with a fluid-dispensing apparatus comprising:

a body having an input end adapted to be connected to said fluid-dispensing apparatus, a network of fluid-carrying channels that transport and divide the fluid supplied by the fluid-dispensing apparatus, and an output end having a plurality of mutually spaced outlet orifices connected to said network of channels to provide a multi-point output, said outlet orifices being located in a patterned arrangement whereby said spray head has an output shaped to accommodate a predetermined target configuration, wherein said output end of said body is of generally concave shape includes sidewalls having at least one of said orifices.

2. A spray head assembly according to claim 1, wherein said output end of said body has an inner surface containing at least one of said orifices and said at least one orifice is oriented generally coaxially of said body.

3. A spray head assembly according to claim 1, wherein said at least one orifice is disposed at an angle with respect to others of said orifices.

4. A spray head assembly for use in conjunction with a fluid-dispensing apparatus comprising:

a body having an input end adapted to be connected to said fluid-dispensing apparatus, a network of fluid-carrying channels that transport and divide the fluid supplied by the fluid-dispensing apparatus, and an output end having a plurality of mutually spaced outlet orifices connected to said network of channels to provide a multi-point output, said outlet orifices being located in a patterned arrangement whereby said spray head has an output shaped to accommodate a predetermined target configuration, wherein a plurality of said orifices have a fluid-dispensing variable-resistance valve; and including a retaining insert to hold said fluid-dispensing variable-resistance valve within its orifice.

5. A spray head assembly according to claim 4, wherein said fluid-dispensing variable-resistance valve is made from an elastomeric material.

6. A spray head assembly according to claim 4, wherein said fluid-dispensing variable-resistance valve includes a tip having a resiliently biased opening.

7. A spray head assembly for use in conjunction with a fluid-dispensing apparatus comprising:

a body having an input end adapted to be connected to said fluid-dispensing apparatus, a network of fluid carrying channels that transport and divide the fluid supplied by the fluid-dispensing apparatus, and an output end having a plurality of mutually spaced outlet orifices connected to said network of channels to provide a multi-point output, said outlet orifices being located in a patterned arrangement whereby said spray head has an output shaped to accommodate a predetermined target configuration, wherein said output end of said body is of generally concave shape having a rectangularly recessed configuration.

8. A spray head assembly according to claim 7, wherein said rectangularly recessed configuration includes an inside surface having at least one of said orifices and said inside surface is in axial alignment with said spray head.

9. A spray head assembly according to claim 8, wherein said output end of said body includes opposed walls having outlet orifices which are generally directed toward the other such opposed wall.

10. A spray head assembly according to claim 9, wherein at least some of said orifices have a fluid-dispensing variable-resistance valve.

11. A spray head assembly according to claim 10, including a retaining insert to hold said fluid-dispensing variable-resistance valves within their corresponding orifice.

12. A spray head assembly according to claim 10, wherein said fluid-dispensing variable-resistance valve is made from an elastomeric material.

13. A spray head assembly according to claim 10, wherein said fluid-dispensing variable-resistance valve has a tip comprising a resiliently biased opening.

14. A spray head assembly for use in conjunction with a fluid-dispensing apparatus comprising:
a body having an input end adapted to be connected to said fluid-dispensing apparatus, a network of fluid-carrying channels that transport and divide the fluid supplied by the fluid-dispensing apparatus, and an output end having a plurality of mutually spaced outlet orifices connected to said network of channels to provide a multi-point output, said outlet orifices being located in a patterned arrangement whereby said spray head has an output shaped to accommodate a predetermined target configuration; and
a mounting member adjustably connected to said body, said mounting member for locking the spray head assembly at different positions relative to the target.

15. A spray head assembly according to claim 14, wherein said mounting member includes a collar and a flange, said collar configured to be slidably disposed on said body and said flange having at least one aperture for receiving a fastener to connect the spray head assembly to a stationary object.

16. A spray head assembly according to claim 15, wherein said collar includes a fastener for securing said mounting member to said body.

17. A spray head assembly adapted for use in conjunction with a fluid-dispensing apparatus comprising:
a body having an input end and an output end, said input end adapted to receive fluid from the fluid-dispensing apparatus, said body configured to transport and divide the fluid between said inlet end and output end, and said output end having a plurality of spray outlets, and a plurality of said spray outlets having a variable-resistance valve for dispensing said fluid, said output end shaped so that at least some of said orifices direct fluid toward a target object from different angles.

18. A spray head assembly according to claim 17, further comprising a mounting member positionable at a plurality of locations along the length of said body to mount said spray head assembly in different positions relative to said target.

19. A spray head assembly for use in conjunction with a fluid-dispensing apparatus comprising:
a body having an input end adapted to be connected to said fluid-dispensing apparatus, a network of fluid-carrying channels that continuously transports and divides the fluid supplied by the fluid-dispensing apparatus, and an output end having a plurality of mutually spaced outlet orifices connected to said network of channels to provide a multi-point output, said outlet orifices being located in a patterned arrangement whereby said spray head has an output shaped to accommodate a predetermined target configuration;
wherein said output end of said body is of generally concave shape including sidewalls having at least one of said orifices.

20. A spray head assembly according to claim 19, wherein said output end of said body has an inner surface containing at least one of said orifices and said at least one orifice is oriented generally coaxially of said body.

21. A spray head assembly according to claim 19, wherein said at least one orifice is disposed at an angle with respect to others of said orifices.

22. A spray head assembly for use in conjunction with a fluid-dispensing apparatus comprising:
a body having an input end adapted to be connected to said fluid-dispensing apparatus, a network of fluid-carrying channels that continuously transports and divides the fluid supplied by the fluid-dispensing apparatus, and an output end having a plurality of mutually spaced outlet orifices connected to said network of channels to provide a multi-point output, said outlet orifices being located in a patterned arrangement whereby said spray head has an output shaped to accommodate a predetermined target configuration;
wherein a plurality of said orifices have a fluid-dispensing variable-resistance valve.

23. A spray head assembly according to claim 22, including a retaining insert to hold said fluid-dispensing variable-resistance valve within its orifice.

24. A spray head assembly according to claim 22, wherein said fluid-dispensing variable-resistance valve is made from an elastomeric material.

25. A spray head assembly according to claim 22, wherein said fluid-dispensing variable-resistance valve includes a tip having a resiliently biased opening.

26. A spray head assembly for use in conjunction with a fluid-dispensing apparatus comprising:
a body having an input end adapted to be connected to said fluid-dispensing apparatus, a network of fluid-carrying channels that continuously transports and divides the fluid supplied by the fluid-dispensing apparatus, and an output end having a plurality of mutually spaced outlet orifices connected to said network of channels to provide a multi-point output, said outlet orifices being located in a patterned arrangement whereby said spray head has an output shaped to accommodate a predetermined target configuration;
wherein said output end of said body is of generally concave shape having a rectangularly recessed configuration.

27. A spray head assembly according to claim 26, wherein said rectangularly recessed configuration includes an inside surface having at least one of said orifices and said inside surface is in axial alignment with said spray head.

28. A spray head assembly according to claim 27, wherein said output end of said body includes opposed walls having outlet orifices which are generally directed toward the other such opposed wall.

29. A spray head assembly according to claim 28, wherein at least some of said orifices have a fluid-dispensing variable-resistance valve.

30. A spray head assembly according to claim 29, including a retaining insert to hold said fluid-dispensing variable-resistance valves within their corresponding orifice.

31. A spray head assembly according to claim 29, wherein said fluid-dispensing variable-resistance valve is made from an elastomeric material.

32. A spray head assembly according to claim 29, wherein said fluid-dispensing variable-resistance valve has a tip comprising a resiliently biased opening.

33. A spray head assembly for use in conjunction with a fluid-dispensing apparatus comprising:

a body having an input end adapted to be connected to said fluid-dispensing apparatus, a network of fluid-carrying channels that continuously transports and divides the fluid supplied by the fluid-dispensing apparatus, and an output end having a plurality of mutually spaced outlet orifices connected to said network of channels to provide a multi-point output, said outlet orifices being located in a patterned arrangement whereby said spray head has an output shaped to accommodate a predetermined target configuration;

further including a mounting member adjustably connected to said body, said mounting member for locking the spray head assembly at different positions relative to the target.

34. A spray head assembly according to claim 33, wherein said mounting member includes a collar and a flange, said collar configured to be slidably disposed on said body and said flange having at least one aperture for receiving a fastener to connect the spray head assembly to a stationary object.

35. A spray head assembly according to claim 34, wherein said collar includes a fastener for securing said mounting member to said body.

* * * * *